(12) United States Patent
Nadeau et al.

(10) Patent No.: US 8,562,022 B2
(45) Date of Patent: Oct. 22, 2013

(54) TRAILER

(75) Inventors: Julien Nadeau, St-Patrice-de-Beaurivage (CA); Michel Guillot, Quebec (CA); Jean-Christian Methot, Rimouski (CA); Russell S. Long, Murrysville, PA (US)

(73) Assignee: Alutrec Inc., St-Nicolas (CA)

( * ) Notice: Subject to any disclaimer, the term of this patent is extended or adjusted under 35 U.S.C. 154(b) by 438 days.

(21) Appl. No.: 12/485,668

(22) Filed: Jun. 16, 2009

(65) Prior Publication Data
US 2009/0315297 A1 Dec. 24, 2009

Related U.S. Application Data

(60) Provisional application No. 61/074,531, filed on Jun. 20, 2008.

(30) Foreign Application Priority Data

Jun. 15, 2009 (WO) ................. PCT/US2009/047408

(51) Int. Cl.
*B62D 63/08* (2006.01)
(52) U.S. Cl.
USPC .... 280/785; 280/789; 296/180.4; 296/193.07
(58) Field of Classification Search
USPC ......... 280/785, 789; 296/180.1, 180.4, 184.1, 296/193.07
See application file for complete search history.

(56) References Cited

U.S. PATENT DOCUMENTS

| | | | |
|---|---|---|---|
| 3,705,732 A | 12/1972 | Marinelli | 280/106 T |
| 4,049,285 A * | 9/1977 | Chieger | 280/789 |
| 4,226,465 A | 10/1980 | McCullough | 296/182 |
| 4,232,884 A | 11/1980 | DeWitt | 280/785 |
| 4,275,663 A | 6/1981 | Sivachenko et al. | 105/413 |
| 4,358,134 A | 11/1982 | Scully | 280/676 |
| 4,626,022 A | 12/1986 | Booher | 296/182 |
| 4,838,605 A | 6/1989 | Abromavage | 296/182 |
| 4,938,524 A * | 7/1990 | Straub et al. | 296/184.1 |

(Continued)

FOREIGN PATENT DOCUMENTS

| | | |
|---|---|---|
| EP | 0584016 | 8/1993 |
| EP | 1609704 | 12/2005 |

OTHER PUBLICATIONS

International Search Report and Written Opinion, mailed Aug. 26, 2009, from corresponding International Application No. PCT/US2009/047408.

(Continued)

*Primary Examiner* — Joseph Rocca
*Assistant Examiner* — Timothy Wilhelm
(74) *Attorney, Agent, or Firm* — Wiley Rein LLP

(57) ABSTRACT

Improved trailers (e.g., semi-trailers) are disclosed. The trailers may include a floor having a top surface and a bottom surface, where the top surface is adapted to transport a payload, and an elongated shell connected to the bottom surface of the floor, where the elongated shell defines a portion of a substantially closed torsion-resistant chamber of the trailer. The trailers may have a torsion resistance that is substantially higher than conventional trailers of similar size and/or load capacity. The trailers may weigh substantially less than conventional trailers of similar size and/or load capacity. The trailers may realize a bending resistance that is at least equivalent to the bending resistance of conventional trailers of similar size and/or load capacity.

21 Claims, 16 Drawing Sheets

(56) References Cited

U.S. PATENT DOCUMENTS

| | | | |
|---|---|---|---|
| 5,280,990 A * | 1/1994 | Rinard | 296/180.1 |
| 5,417,453 A * | 5/1995 | VanDenberg | 280/785 |
| 6,109,684 A * | 8/2000 | Reitnouer | 296/184.1 |
| 6,174,023 B1 | 1/2001 | Booher | 296/182 |
| 6,182,411 B1 | 2/2001 | Ganser et al. | 52/480 |
| 6,283,538 B1 | 9/2001 | Reitnouer | 296/182 |
| 6,439,814 B1 | 8/2002 | Floe | 410/7 |
| 6,669,271 B2 | 12/2003 | Booher | 296/181 |
| 6,837,536 B1 * | 1/2005 | Schwartz | 296/180.4 |
| 6,948,895 B2 | 9/2005 | Buff | 410/104 |
| 7,093,889 B2 * | 8/2006 | Graham | 296/180.4 |
| 7,578,541 B2 * | 8/2009 | Layfield et al. | 296/180.2 |
| 7,780,224 B2 * | 8/2010 | Roush | 296/180.4 |
| 7,789,453 B2 * | 9/2010 | Roush et al. | 296/180.1 |
| 7,798,558 B2 * | 9/2010 | Messier | 296/184.1 |
| 2004/0007864 A1 | 1/2004 | Adams | 280/789 |
| 2004/0009049 A1 | 1/2004 | Booher | 410/47 |
| 2004/0135398 A1 | 7/2004 | Booher | 296/182.1 |
| 2006/0071506 A1 | 4/2006 | Adams | 296/184.1 |
| 2007/0096537 A1 | 5/2007 | Hicks | 298/33 |

OTHER PUBLICATIONS

Fontaine Revolution Aluminum Trailers, online at www.fontainetrailer.com, © 2007, Fontaine Trailer Company, Haleyville, Alabama, Mar. 2007.

* cited by examiner

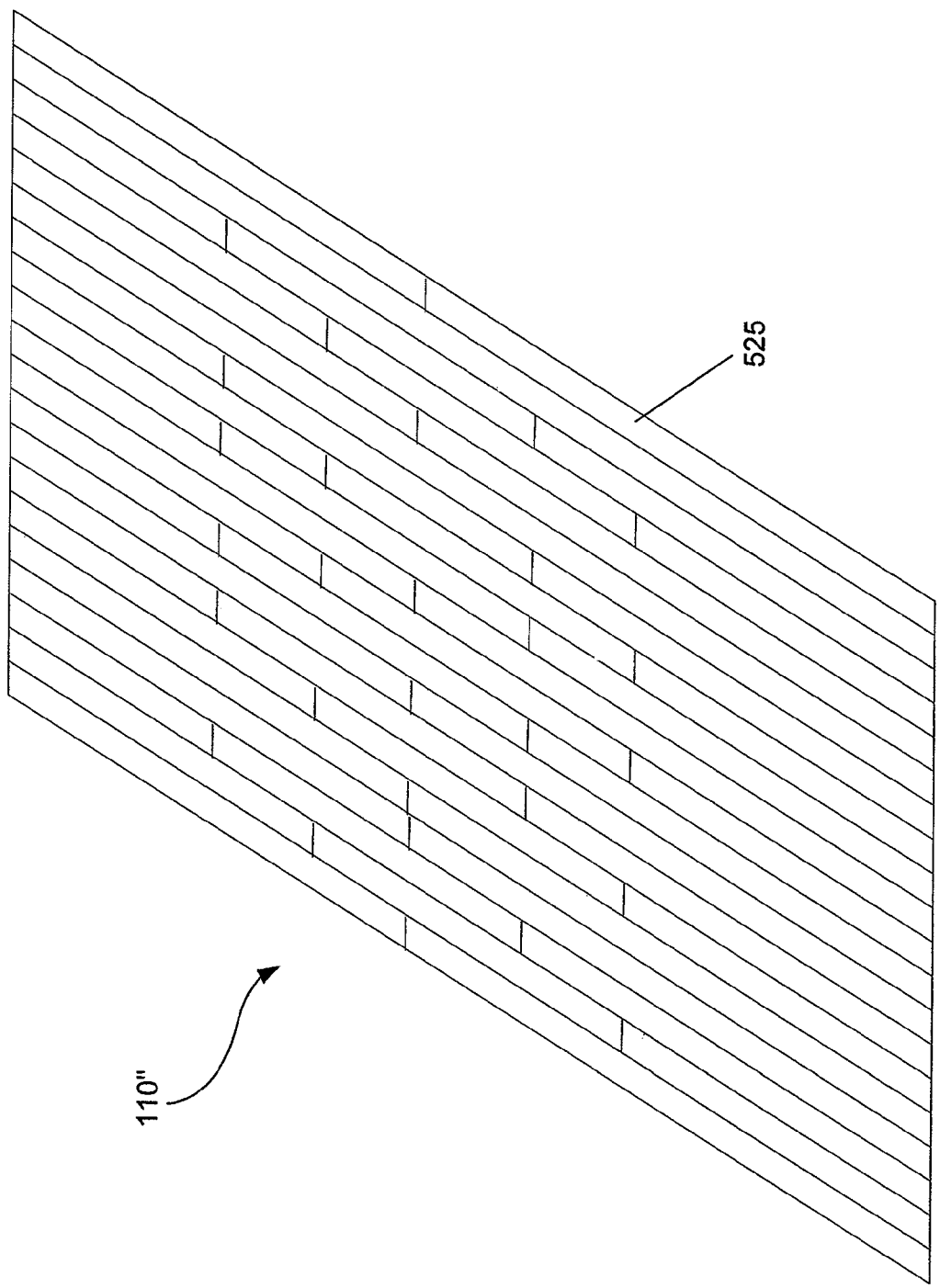

TRAILER

CROSS-REFERENCE TO RELATED APPLICATION

This application claims priority to U.S. Provisional Patent Application No. 61/074,531, entitled "TRAILER," filed on Jun. 20, 2008, and to PCT Patent Application No. PCT/US09/47408, entitled "TRAILER," filed on Jun. 15, 2009. Each of the above-identified patent applications is incorporated herein by reference in its entirety.

BACKGROUND

Commonly, the term trailer refers to vehicles used for transport of goods and materials. A semi-trailer is a trailer without a front axle. A large proportion of a semi-trailer's weight is supported either by a road tractor or by a detachable front axle assembly known as a dolly. A semi-trailer is normally equipped with legs, called "landing gear," which can be lowered to support it when it is uncoupled.

SUMMARY OF THE DISCLOSURE

In one aspect, a trailer is disclosed (e.g., a semi-trailer). In one approach, the trailer includes a floor and an elongated shell connected to the floor. The floor may include a top surface and a bottom surface, and the elongated shell may be connected to the bottom surface of the floor. The top surface of the floor may be adapted to transport a payload. The elongated shell defines a portion of a substantially closed torsion-resistant chamber of the trailer. The substantially closed torsion-resistant chamber may facilitate, for example, a strategic distributing of mass located further from the neutral axis of the trailer and/or a higher stiffness to weight ratio. In one embodiment, the substantially closed torsion-resistant chamber comprises a plurality of interconnected plates. In one embodiment, the substantially closed torsion-resistant chamber comprises a plurality of interconnected extrusions.

The substantially closed torsion-resistant chamber is a structure that is largely hollow, with a mostly opening-free skin encompassing its outer perimeter, and is constructed such that an applied torque will cause a lower torsion deflection than a conventional trailer of similar size and load capacity. In one embodiment, the trailer may have a torsion deflection (measured as angular deformation θ), that is less than the torsion deflection of a conventional trailer of similar size and load capacity. In one embodiment, the angular deformation θ of the trailer is at least 50% less than the angular deformation θ' of a conventional trailer. In one embodiment, the trailer weighs at least 10% less than the conventional trailer, and the trailer has a bending resistance that is at least equivalent to the bending resistance of the conventional trailer.

In one embodiment, the elongated shell is connected to at least one bottom surface of the floor, where, as connected, the elongated shell and the floor define the substantially closed torsion-resistant chamber. In one embodiment, the elongated shell defines bottom and side portions of the substantially closed torsion-resistant chamber, and the floor defines top portions of the substantially closed torsion-resistant chamber. In another embodiment, the elongated shell defines the top, bottom and side portions of the substantially closed torsion-resistant chamber.

In one embodiment, the elongated shell includes a neck portion located proximal the front of the trailer. In one embodiment, the neck portion comprises a plurality of supporting ribs. In one embodiment, the elongated shell comprises a main body portion adjacent the neck portion.

In one embodiment, the floor includes a plurality of elongated support members. In one embodiment, a first one of the plurality of elongated, support members is generally parallel to a longitudinal axis of the trailer, and a second one of the plurality of elongated support members is transverse to the longitudinal axis of the trailer. In one embodiment, the first one of the plurality of elongated support members is located proximal the front of the trailer. In one embodiment, the second one of the plurality of elongated support members is located proximal the middle and/or rear of the trailer. In one embodiment, the first support member has a larger height than the second support member. In this embodiment, a transitional support member may connect that first support member and the second support member.

In one embodiment, at least one of the elongated support members comprises one or more shaped internal member, which is at least one of X-shaped, W-shaped, Y-shaped, and I-shaped. These shaped internal members may be arranged between a top member and a bottom member. In one embodiment, the elongated support member includes at least one thin member stretching between a shaped internal member and the top member. In one embodiment, the elongated support member includes at least one thin member stretching between the shaped internal member and the bottom member.

These and other aspects, advantages, and novel features of the instant disclosure are set forth in part in the description that follows and will become apparent to those skilled in the art upon examination of the following description and figures, or may be learned by practicing the technology of this disclosure.

BRIEF DESCRIPTION OF THE DRAWINGS

FIG. 5c illustrates another embodiment of a floor of a trailer.

DETAILED DESCRIPTION

Figure 1:
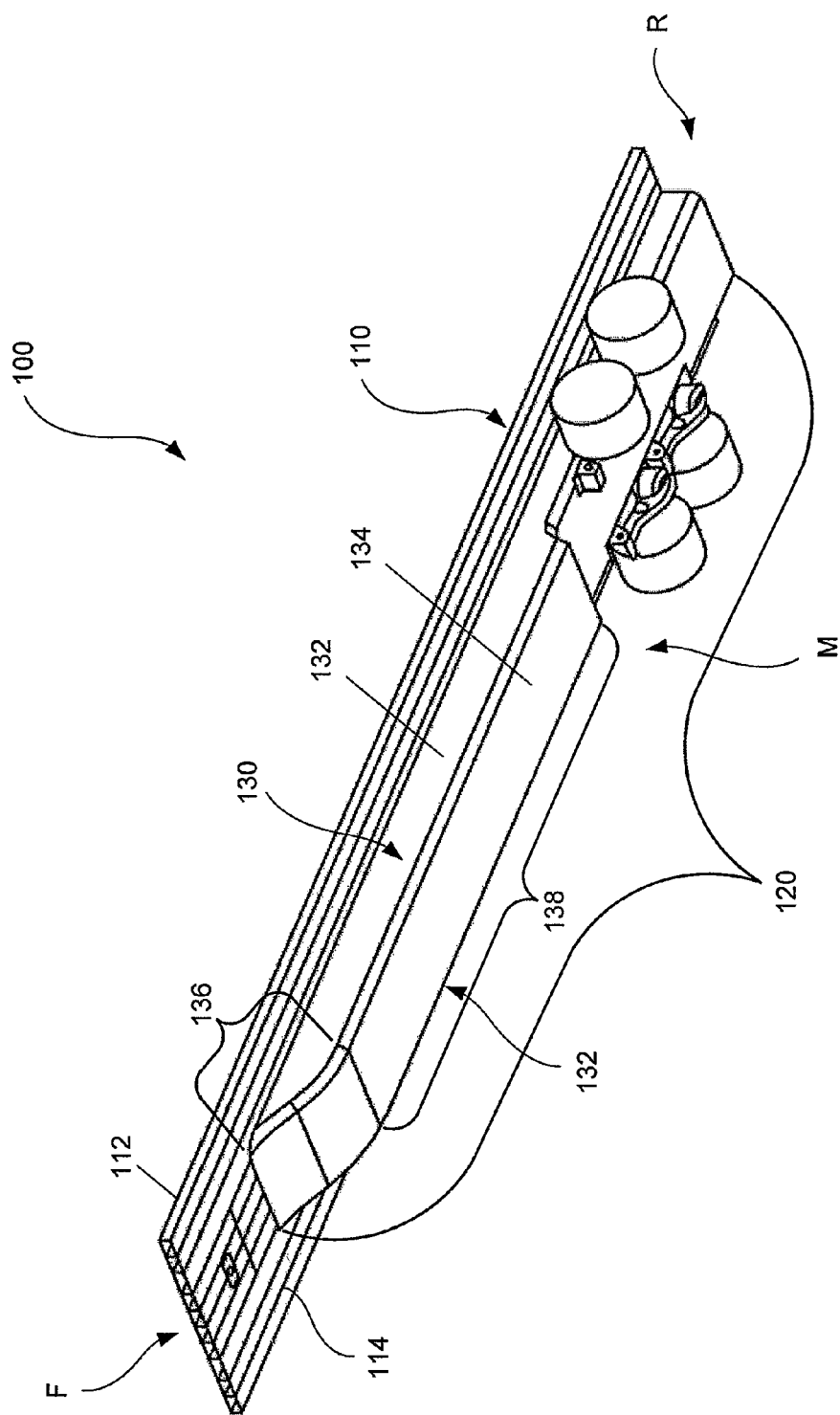
FIG. 1 illustrates one embodiment of a trailer.

Reference will now be made in detail to the accompanying drawings, which at least assist in illustrating various pertinent embodiments of the present disclosure. FIG. 1 illustrates one embodiment of a trailer 100. In the illustrated embodiment, the trailer 100 includes a floor 110 and an elongated shell 120. The floor 110 includes a top surface 112 and a bottom surface 114, and the elongated shell 120 is connected to the bottom surface 114 of the floor 110. The top surface 112 may be configured to carry a payload. In an embodiment, as connected, the elongated shell 120 and the floor 110 define a substantially closed torsion-resistant chamber 130.

The substantially closed torsion-resistant chamber 130 is a structure that is largely hollow, with a mostly opening-free skin encompassing its outer perimeter, and is constructed such that an applied torque will cause a lower torsion deflection than a conventional trailer having a similar load capacity. The trailer 100 may also realize an equal or better bending resistance than a conventional trailer due to, at least in part, the substantially closed torsion-resistant chamber 130. In the illustrated embodiment, the substantially closed torsion-resistant chamber 130 includes lateral sides 132, a bottom 134, and a top (not illustrated), the top being associated with the floor 110 of the trailer 100. These components may define a torsion-box configuration. The substantially closed torsion-resistant chamber 130 may include a first portion 136 (e.g., a neck) associated with a front F of the trailer 100 and a second portion 138 (e.g., a main body) associated with a middle M and/or rear R of the trailer 100. The substantially closed torsion-resistant chamber may comprise a plurality of interconnected wrought products (e.g., wrought aluminum products), such as sheets, plates, extrusions, and/or forgings. These products may be interconnected via suitable apparatus and/or methods, such as welding, fasteners and the like. Other materials and/or methods may be used to produce the substantially closed torsion-resistant chamber.

Since the trailer 100 includes the substantially closed torsion-resistant chamber 130, the trailer 100 may be torsion resistant and/or bending resistant relative to conventional trailers of similar size (e.g., dimensions and/or mass) and load capacity. Since the trailer 100 includes the substantially closed torsion-resistant chamber 130. The trailer 100 may realize, among other things, (i) a strategic distribution of mass located further from the neutral axis (e.g., the longitudinal axis through the center of gravity of the trailer 100); and/or (ii) a higher stiffness-to-weight ratio. These benefits may at least facilitate better on-road performance of the trailer 100. For example, better stiffness coupled with lighter weight may provide the ability to haul bigger payloads, resulting in a more rapid return on investment. Furthermore, when made of aluminum, the trailer 100 may realize longer lifetime than a conventional trailer.

Figure 2B:
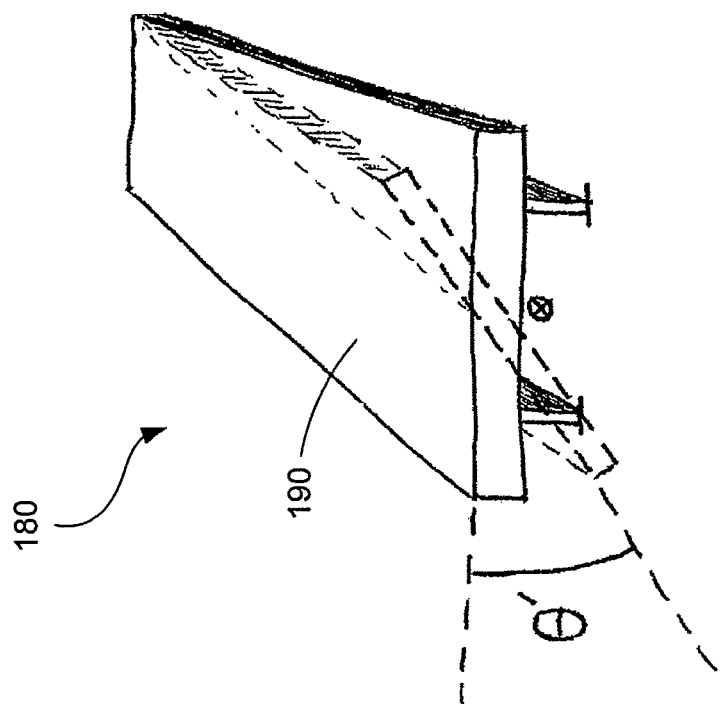
FIG. 2b illustrates one embodiment of angular deformation of a conventional trailer.
Figure 2A:
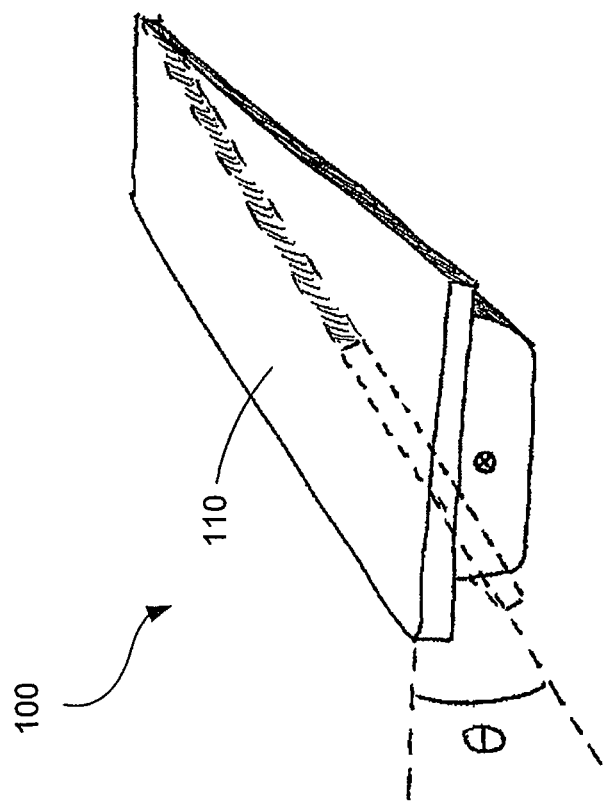
FIG. 2a illustrates one embodiment of angular deformation of the trailer of FIG. 1.

One or more of the above-noted benefits may be realized due to the ability of the substantially closed torsion-resistant chamber 130 to withstand angular deformation. For example, and with reference now to FIG. 2a-2b, the floor 110 of the trailer 100 may have a torsion deflection (measured as angular deformation θ), that is less than the torsion deflection (measured as angular deformation θ') of a floor 190 of a conventional trailer 180 having a similar size and load capacity. In one embodiment, the angular deformation θ of the trailer 100 may be at least 5% better than the angular deformation θ' of a conventional trailer 180. For example, if the new trailer 100 realizes an angular deformation of 17.14°, and the conventional trailer realizes an angular deformation of 18.00°, the new trailer 100 has 5% better angular deformation than that of the conventional trailer ((18−17.14)/17.14=5%). In other embodiments, the angular deformation θ of the trailer 100 is at least 10% better, or at least 25% better, or at least 50% better, or at least 75% better, or at least 100% better, or at least 200% better, or at least 300% better, or at least 400% better, or at least 500% better than the angular deformation θ' of the conventional trailer 180. In an embodiment, angular deformation of a trailer (new or conventional) may be determined using finite element analysis software (e.g., Unigraphics, Nastran).

As described above, the substantially closed torsion-resistant chamber generally includes lateral sides 132, a bottom 134 and a top (not illustrated). The dimensions of the substantially closed torsion-resistant chamber 130 may be tailored relative to the size of the trailer. For example, a standard flat-bed trailer having a length of about 50 to 60 feet (e.g., about 53 feet), the substantially closed torsion-resistant chamber 130 may have a height (e.g., from the bottom 134 to the top) in the range of from about 18 to about 22 inches, a width (e.g., from lateral side to lateral side 132) in the range of from about 40 to about 50 inches, and a length (from the front of the first portion 136 to the rear of the second portion 138) in the range of from about 40 to about 48 feet. These dimensions and the ratios thereof (e.g., height to width) may facilitate at least a portion of the resistance of the substantially closed torsion-resistant chamber 130. Other trailers may have other lengths, such as in the range of 25 to 60 feet, and the dimension of the substantially closed torsion-resistant chamber 130 may be tailored relative to the size of the trailer, so long as the torsion resistance of the trailer is maintained.

Figure 3:
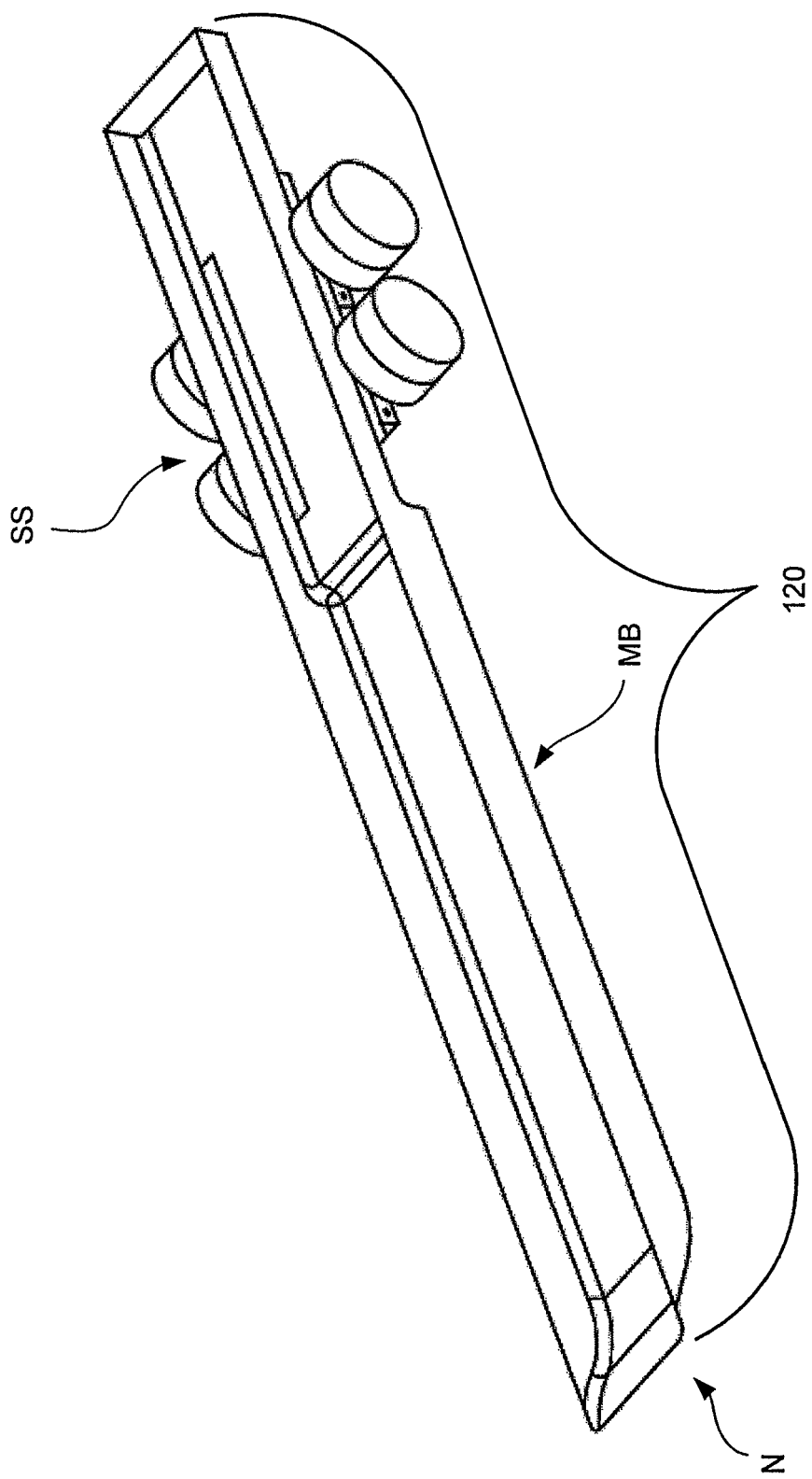
FIG. 3 illustrates one embodiment of the elongated shell of FIG. 1 (excluding supporting ribs).

As described above, the trailer 100 includes an elongated shell 120, one embodiment of which is illustrated in FIG. 3. In the illustrated embodiment, and with reference to FIGS. 1 and 3, the elongated shell 120 is a long, shell-like structure that is at least a portion of the substantially closed torsion-resistant chamber 130. In one embodiment, as connected, the elongated shell 120 and the bottom surface 114 of the floor 110 define the substantially closed torsion-resistant chamber 130. In other words, the elongated shell 120 may define bottom 134 and lateral side portions 132 of the substantially closed torsion-resistant chamber 130, and the bottom surface 114 of the floor 110 may define top portions (not illustrated) of the substantially closed torsion-resistant chamber 130. In other embodiments, the elongated shell 120 may define at least the top, bottom 134, and lateral side portions 132 of the substantially closed torsion-resistant chamber 130. In such an embodiment, the floor 110 may make up little or none of the substantially closed torsion-resistant chamber 130. In an embodiment, the elongated shell 120 may be connected to the floor 110 via welding (e.g., MIG welding), bonding or other methods. In an embodiment, the elongated shell 120 may be connected to one or more support members of the floor, described in further detail below.

The elongated shell 120 may include a neck portion N. In one embodiment, and with continued reference to FIGS. 1 and 3, the neck portion N may be located proximal the front F of the trailer 100. The neck portion gradually decreases the height of the elongated shell (e.g., tapers down) prior to reaching the front end of the trailer so as to provide room for a fifth wheel or landing gear, for instance. In an embodiment, the elongated shell 120 includes a main body MB portion adjacent the neck portion N. The neck portion N and/or the main body portion MB may have a regular or non-regular cross-sectional profile (e.g., when viewed from a side of the trailer 100). The elongated shell 120 may be connected to a suspension system SS of the trailer 100 via conventional apparatus and methods. The suspension system SS may be a system of springs, shock absorbers, linkages, and/or other components that can connect the floor and/or elongated shell to one or more wheels.

Figure 4:
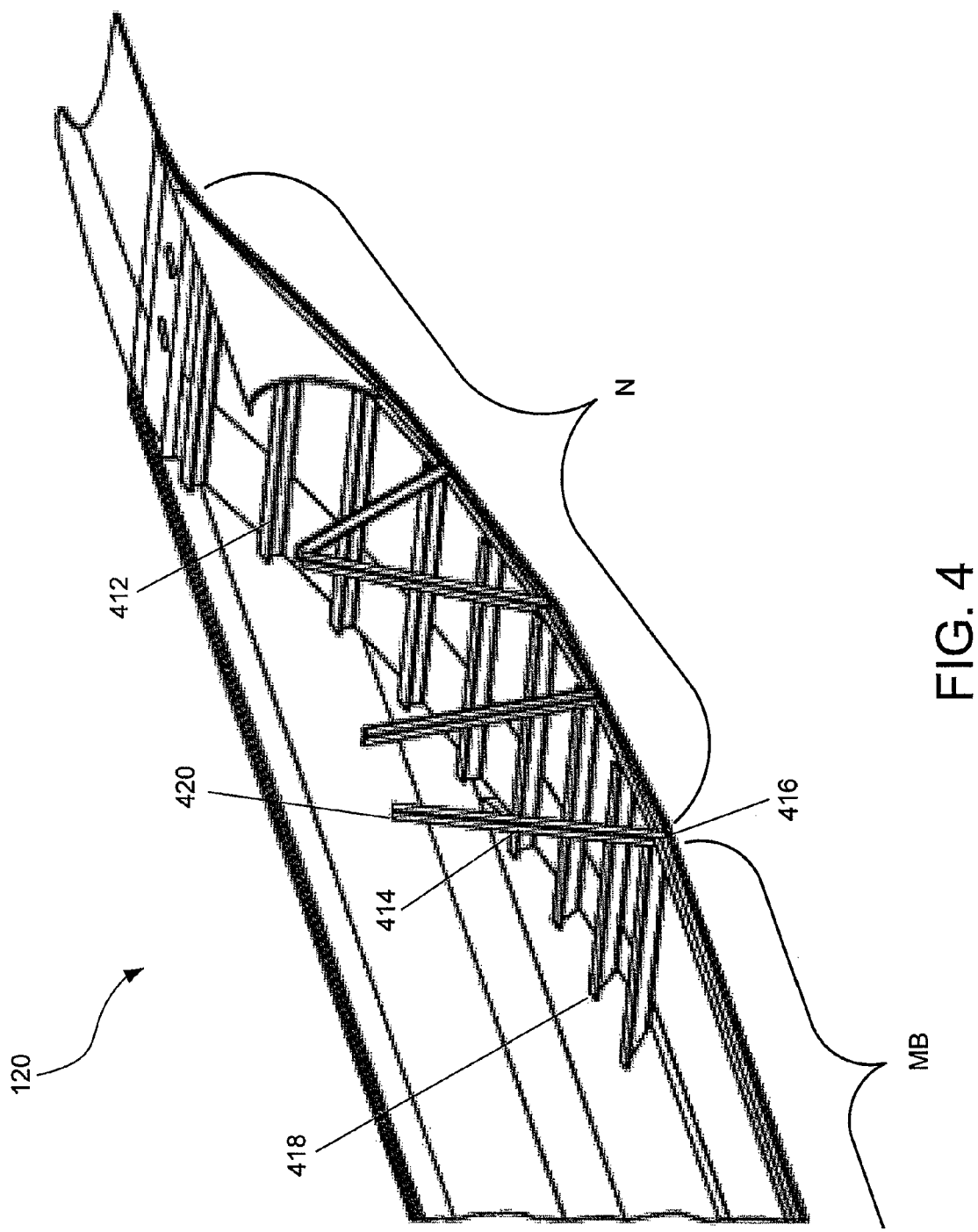
FIG. 4 illustrates one embodiment of a first portion of the trailer of FIG. 1.

Since the shape of the neck N generally decreases the height of the lateral sides of the substantially closed torsion-resistant chamber, the torsion resistance and/or bending resistance of the neck may be less than the main body portions of the substantially closed torsion-resistant chamber. Thus, in an embodiment, and with reference now to FIG. 4, the neck portion N may include one or more supporting ribs 412, 414. The supporting ribs 412, 414 may be, for example, I-beams or other rigid beams. The ends of the supporting ribs 412, 414 may connect to the elongated shell and/or floor. In an embodiment, a first portion 416 of the supporting rib 412 or 414 connects to the elongated shell 120 (e.g., a first lateral side and/or bottom of the elongated shell). In a related embodiment, a second portion 418 of supporting rib 412 connects to another portion the elongated shell 120 (e.g., a second side of the elongated shell). In another embodiment, a second portion 420 of supporting rib 414 connects to the floor (not illustrated). A plurality of supporting ribs may be utilized and each may connect with the elongated shell and/or floor. In the illustrated embodiment, the main body portion MB is generally free from supporting ribs 412, 414. In another embodiment, the main body portion MB may comprise one or more ribs so as to restrict angular deformation and/or bending deformation of the elongated shell.

Referring back to FIG. 3, the elongated shell 120 may be produced via various methods. In an embodiment, the elongated shell 120 comprises a number of connected sheets. These sheets may be substantially flat, or may have bends, curves, or other non-regular shapes, or a combination thereof. In an embodiment, these sheets may be connected via welding (e.g., MIG welding) or other methods.

In an embodiment, the elongated shell 120 comprises a number of connected extrusions. In an embodiment, these extrusions may be connected via welding (e.g., MIG welding) or other methods. For example, two extrusions may each have a first edge/surface connected to the bottom surface of the floor 114 via welding or other methods, and a second edge/surface connected to the other extrusion via welding or other methods.

In an embodiment, the elongated shell 120 comprises a number of connected sheets and extrusions. In an embodiment, the elongated shell 120 comprises a U-shape configuration (as viewed along the longitudinal axis of the trailer 100). Such U-shape configuration can include any curvature (e.g., exponential or hyperbolic) and/or flat portions. Unlike the floor, the elongated shell is generally not adapted to carry/contain a payload. However, it is anticipated that, in some embodiments, the elongated shell could be adapted to include at least a portion of the payload. A payload is the main cargo intended for delivery from a first location to a distant second location as carried via the trailer.

In an embodiment, the elongated shell 120 may comprise one or more apertures (not illustrated) so long as such apertures do not substantially degrade the resistance of the substantially closed torsion-resistant chamber 130. For example, the elongated shell 120 may include apertures for drainage. In an embodiment, the apertures may be reinforced (e.g., via a ring of welded metal surrounding the aperture) to compensate for any loss of resistance caused by the apertures.

Figure 5A:
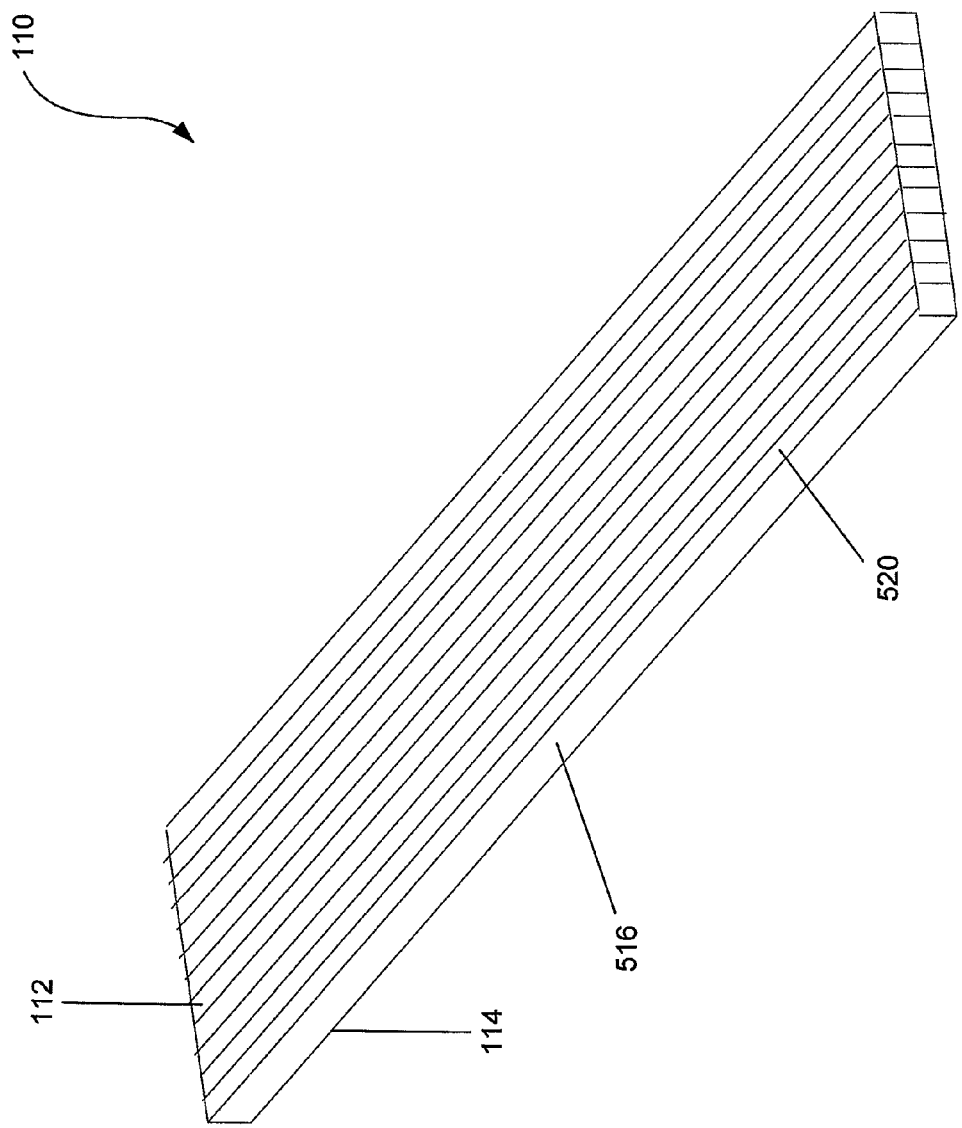
FIG. 5a illustrates one embodiment of the floor of the trailer of FIG. 1.

As noted, the trailer 100 includes a floor 110, one embodiment of which is illustrated in FIGS. 1 and 5a. The floor 110 may be a load-bearing structure of the trailer 100 having a generally planar surface, and which is configured to carry a payload, such as, for instance, a plurality of steel coils. The floor 110 may be made of metal (e.g., aluminum alloys), composite materials, other generally rigid materials (e.g., wood), or any combination of the above. The floor 110 may comprise a top surface 112, a bottom surface 114, and one or more side surfaces 516, for example, front, back, left, and right surfaces.

To facilitate adequate support of the payload, the floor 110 may comprise a plurality of support members 520. The support members 520 may be elongated load-bearing components of the floor 110. In an embodiment, the floor 110 may comprise a plurality of interconnected support members 520, where each support member 520 is connected to at least one other support member 520 (e.g., via two of the long sides of each support member 520). In other words, a plurality of support members 520 may be attached side to side in order to form at least a portion of a floor. Attachment may be made via welding (e.g., MIG welding) or other methods. In an embodiment, a majority of the support members 520 face a coincidental direction (e.g., are parallel to each other). In an embodiment, the support members are substantially hollow.

The support members 520 of the floor 110 may be arranged in any suitable configuration. For instance, and with reference now to FIG. 5b, a first portion 510 of a floor 110' may comprise a first plurality of support members 521, which face a first direction (e.g., a front or rear of the trailer). In a related embodiment, a second portion 512 of the floor 110' may comprise support members 523, which face in a second direction (a direction different than the first direction, such as a side of the trailer). In an embodiment, the first portion 510 of the floor 110' is related to a front F of the trailer (e.g., near where the trailer 100 connects to a self-propelled vehicle). In a related embodiment, the second portion 512 of the floor 110' is related to a middle M and/or rear R of the trailer. The elongated support members may have a height, for example, in the range of 2 to 6 inches, and a width, for example, in the range of 4 to 24 inches. The length of the elongated support members may be based on location and orientation within the floor. For example, the length of the elongated support members may be in the range of from about 2 to about 53 feet. In some embodiments, the length of the elongated support members is in the range of from about 4 to about 27 feet, or in the range of from about 6 to about 15 feet, or in the range of from about 8 to about 12 feet.

Figure 5B:
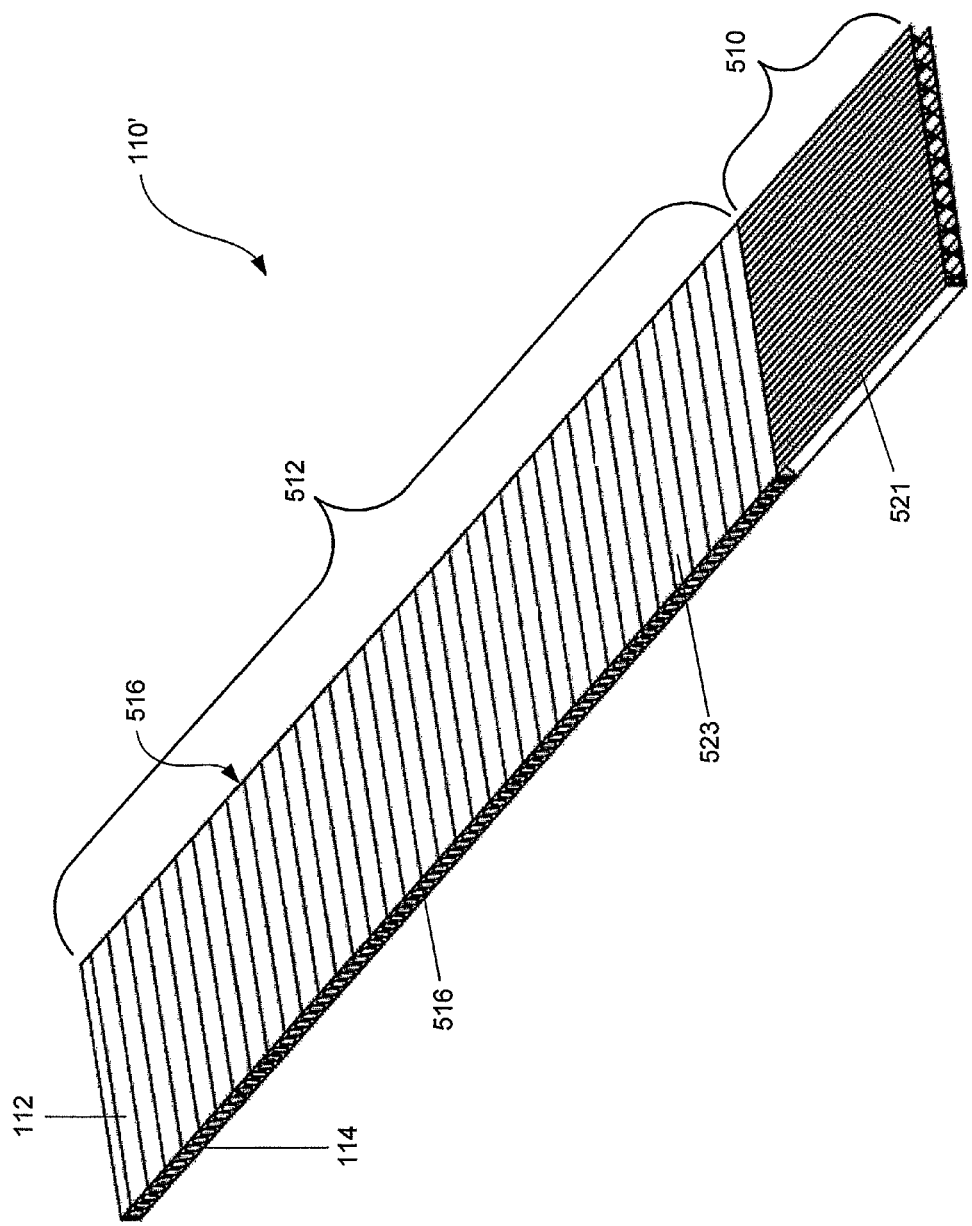
FIG. 5b illustrates another embodiment of a floor of a trailer.

As illustrated in FIG. 5b, the first plurality of elongated support members 521 have their longitudinal axes generally parallel to the longitudinal axis of the floor, and the second plurality of elongated support members 523 have their longitudinal axes generally transverse to the longitudinal axis of the floor. As used herein, transverse means lying or being across, or in a crosswise direction. In one embodiment, transverse means perpendicular. The embodiment of FIG. 5b may be useful, for example, in mitigating stress proximal the neck N of the substantially closed torsion-resistant chamber. Such a configuration may provide higher strength at lower weights than conventional support members. In the illustrated embodiment, the elongated support members 521, 523 have a length less than the length of the floor 110.

In another embodiment, illustrated in FIG. 5c, elongated support members 525 have a length less than the length of a floor 110", but are configured coincidental to (e.g., parallel to) the longitudinal axis of the floor 110". As illustrated, the elongated support members 525 may be configured in a staggered arrangement. In such an embodiment, the elongated support members 525 may be connected to each other via one or more end(s) or lateral side(s) of each other. The embodiment of FIG. 5c may be useful, for example, when employed in the second portion 512 (FIG. 5b) of the trailer 110'.

The embodiment illustrated in FIG. 5a is useful in accordance with the instant disclosure. However, the challenge and expense of extruding elongated support members roughly equal to the length of the floor may make the embodiments illustrated in FIGS. 5b and 5c an easier implementation. Thus, the elongated support members of FIGS. 5b and 5c may be manufactured more easily and at less cost than those of FIG. 5a. For example, the length of the first plurality of elongated support member 521 of FIG. 5b may be in the range of 10-12 feet. The length of the second plurality of elongated support members 523 of FIG. 5b, may be about the same as the desired width of the floor 110', or in the range of about 7-9 feet.

Figure 6:
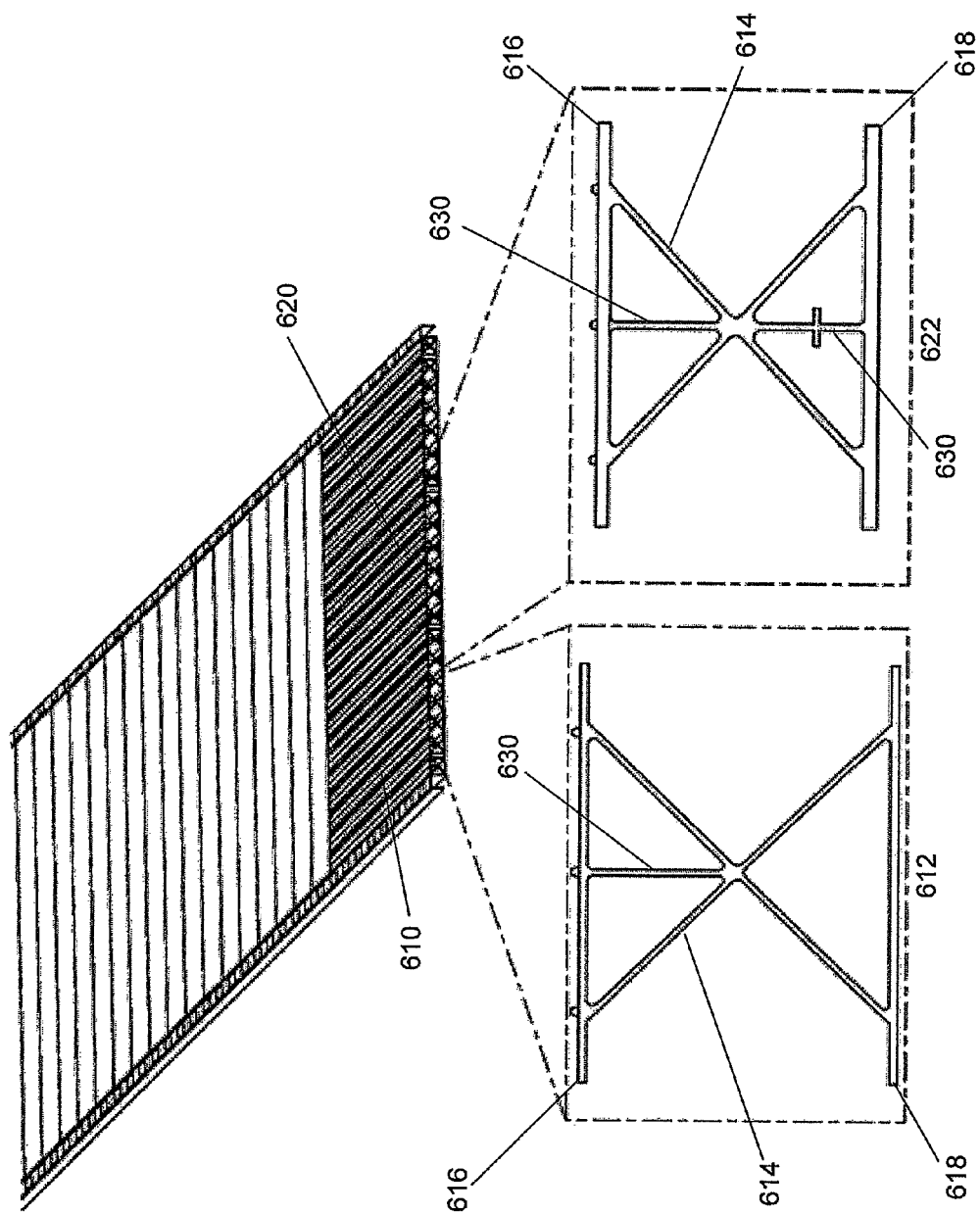
FIG. 6 illustrates embodiments of support members of the floor of FIG. 5b.

The floor may be assembled from support members having similar or differing cross-sectional profiles. In some embodiments, at least some of the support members have the same cross-sectional profile. In some embodiments, at least some of the support members have differing cross-sectional profiles. For instance, and with reference now to FIG. 6, a first plurality of support members 610 may have a first profile 612, and a second plurality of support members 620 may have a second profile 622. In the illustrated embodiment, the first profile 612 includes crossing or diagonally intersecting internal members 614 (e.g., X-shaped internal members) arranged between a top outer member 616 and a bottom outer member 618. The top outer member 616 and the bottom outer member 618 may be generally parallel to each other. In one embodiment, a thin member 630 may stretch between (i) the diagonally intersecting members 614 and (ii) the top outer member 616 and/or the bottom outer member 618. In some embodiments, not illustrated, the support members may include sidewalls (not illustrated).

Figure 7A:
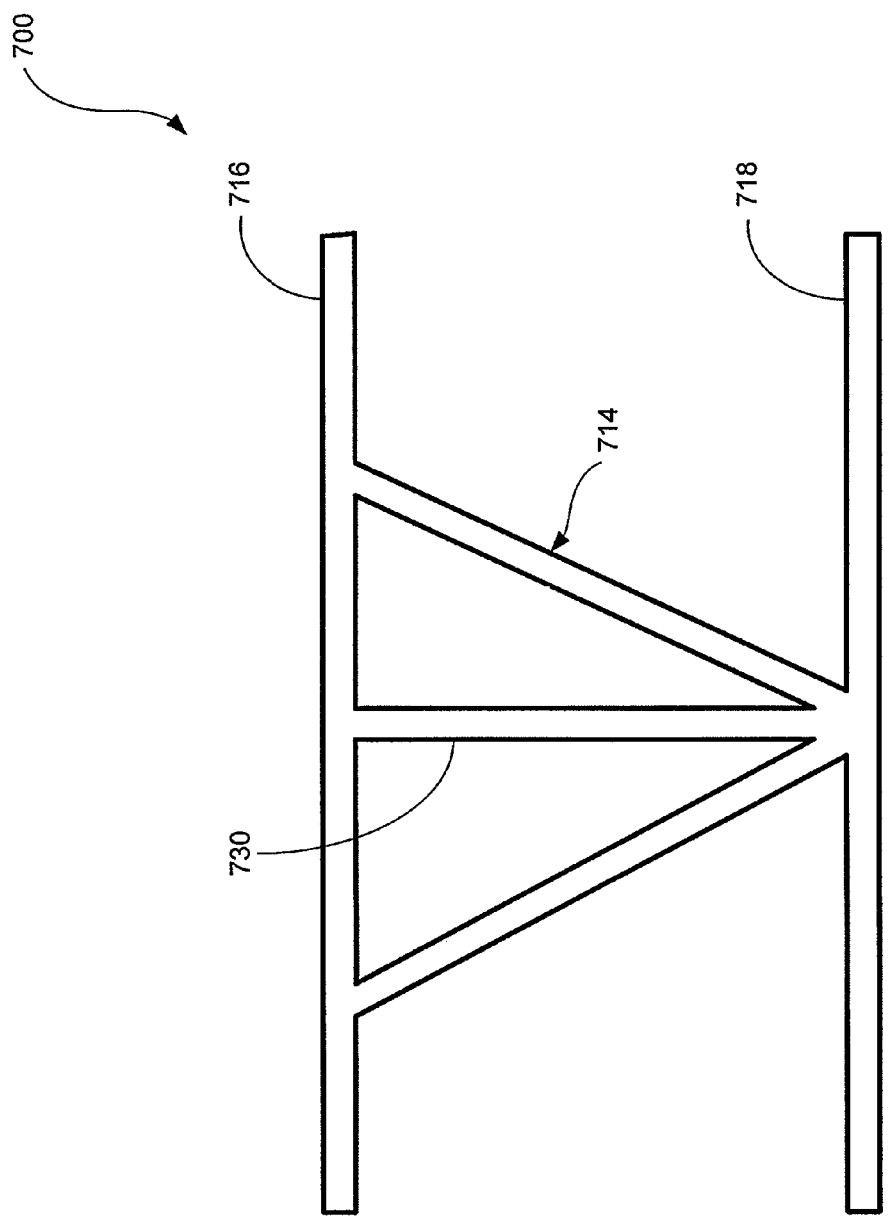
FIG. 7a illustrates another embodiment of a support member of a floor.

The internal members of the elongated support members may be utilized to increase the load bearing capacity of the elongated support members and/or reduce the size and/or weight of the elongated support members (and hence the trailer). The illustrated embodiment of FIG. 6 includes X-shaped internal members, which may include one or more protruding vertical members (illustrated) or horizontal members (not illustrated). Other internal member configurations may be utilized. For instance, any of an X-shaped, V-shaped, W-shaped, I-shaped or other alphabetic and/or numeric shaped internal members may be used. For example, and with reference to FIG. 7a, a support member 700 may include a V-shaped internal member 714 connected to a top member 716 and a bottom member 718. The support member 700 may also include a thin vertical member 730 stretching from the V-shaped member to one of the top 716 and/or bottom 718 members (depending on the orientation of the "V").

In some embodiments, the internal members of the elongated support member may form triangular, trapezoidal, or other geometric shapes within the chamber of the elongated support member. The internal members may be oriented normally (upwards), sideways or upside-down, as appropriate. The internal members generally stretch between the top and bottom members of such support members. However, in some instances, in sideways (and perhaps in other orientations) such internal members may stretch between one or more sidewalls and one or more of the top or bottom members. In some embodiments, one or more elongated support members may be free of internal members.

Figure 7B:
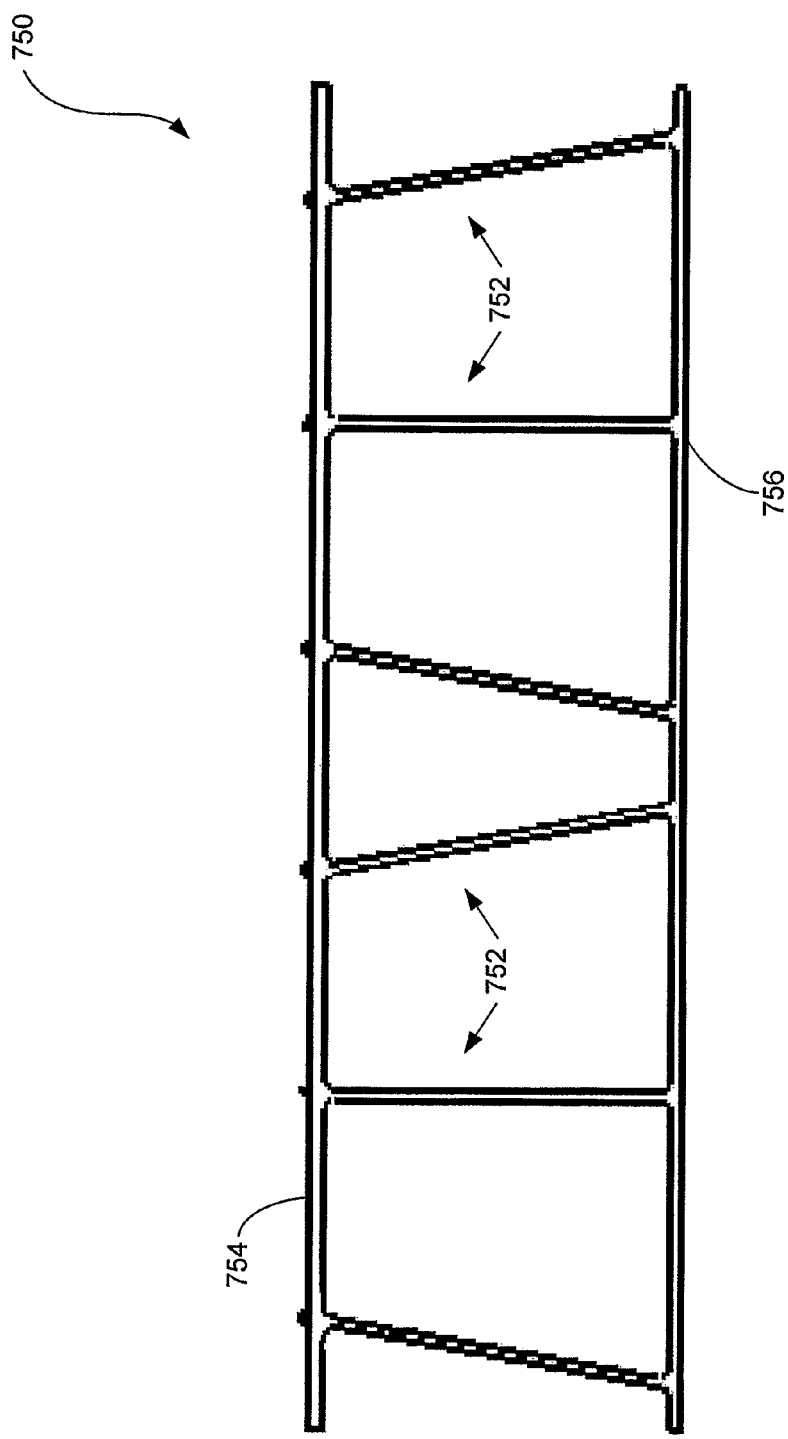
FIG. 7b illustrates another embodiment of a support member of a floor.
Figure 7C:
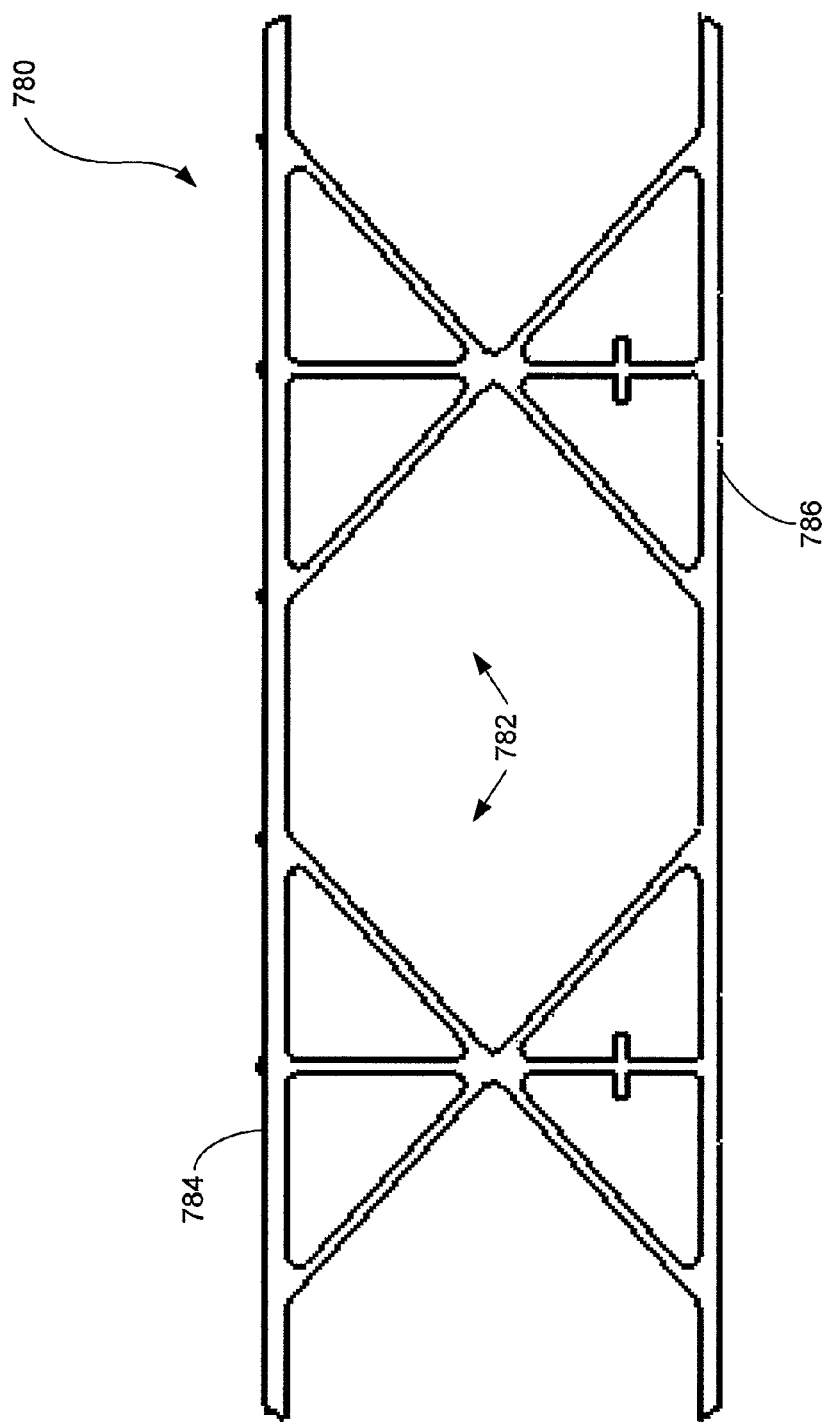
FIG. 7c illustrates another embodiment of a support member of a floor.

The support members may be produced (e.g., extruded) in single sections, as illustrated above, or in a plurality of sections. For example, and with reference now to FIGS. 7b and 7c, support members 750, 780 may include a plurality of X-shaped, V-shaped, W-shaped, I-shaped or other shaped internal members 752, 782 stretching between top members 754, 784 and bottom members 756, 786. Such support members may be useful, for example, in reducing the amount of effort required to produce a floor of a trailer. Such support members 750, 780 may have a width in the range of from about 8 to about 24 inches, whereas the above-described single section support members may have a width in the range of from about 4 to about 8 inches. Other internal member configurations may be employed.

Support members may be made of metal (e.g., aluminum alloys), composite materials, other generally rigid materials (e.g., wood), or any combination of the above. In an embodiment, support members may be extruded. In an embodiment support members may be produced from a plurality of components (e.g., top horizontal thin member, bottom horizontal thin member, side members, internal members) connected via welding (e.g., MIG) or other methods. In an embodiment, a support member is produced via a single extrusion. In one embodiment, at least some of the support members are produced from an aluminum alloy. The aluminum alloy may be any of a 2XXX, 3XXX, 4XXX, 5XXX, 6XXX, 7XXX or 8XXX series aluminum alloy. In one embodiment, a support member and/or at least some of the elongated shell is a 6XXX series alloy, such as AA6061.

In another embodiment, a first plurality of support members has a first set of dimensions (e.g., a height of 2.5 inches) and a second plurality of support members has a second set of dimensions (e.g., a height of 3.5 inches). For example, in the front F of a trailer, it may be useful to include larger (e.g., thicker, and/or taller) elongated support members since the front F of the trailer may experience differing stresses than middle M and/or rear R portions of the trailer. Hence, in one embodiment, smaller (e.g., thinner and/or shorter), elongated support members may be used in the middle M and/or rear R portions of a floor of a trailer (e.g., section 512 of FIG. 5b), and larger elongated support members may be used in front F portions of a floor of a trailer (e.g., section 510 of FIG. 5b).

Given an embodiment in which some support members have differing dimensions, transitional support members may be used to transition between these support members. For instance, and with reference now to FIG. 8a, a transitional support member 800 may include a first side portion 830, a middle portion 810, and a second side portion 840. The first side portion 830 may be configured/sized to cooperatively engage with a first elongated support member (not illustrated) of a similar size. For instance, the first side portion 830 may be attached to the first elongated side member via welding, mechanical attachment or other apparatus/methods. Likewise, the second side portion 840 may be configured/sized to cooperative engage with a second elongated support member (not illustrated) of a similar size. The first and second side portions may include internal members 832, 842 similar to those of the elongated support members, and thus may include any of the X-shaped, V-shaped, W-shaped, I-shaped or other shaped internal members, as described above.

The middle portion 810 of the transitional support member is generally asymmetric as it is configured to transition between the first side portion 830 and the second side portion 840, which are of different sizes. In the illustrated embodiment, the middle portion 810 has a generally trapezoidal shape; a generally parallel first side member 812 and second side member 814, and a third member 816 that is not parallel to a portion of a fourth member 818, but is orthogonal to the first and second side members 812, 814. Other geometric configurations may be utilized. In an embodiment, the first side member 812 has a height about equal to a height of the first side portion 830. The second side member 814 has a height about equal to a height of the second side portion 840. The middle member 810 may include internal members 820, such as any of the above-described internal members.

Figure 8A:
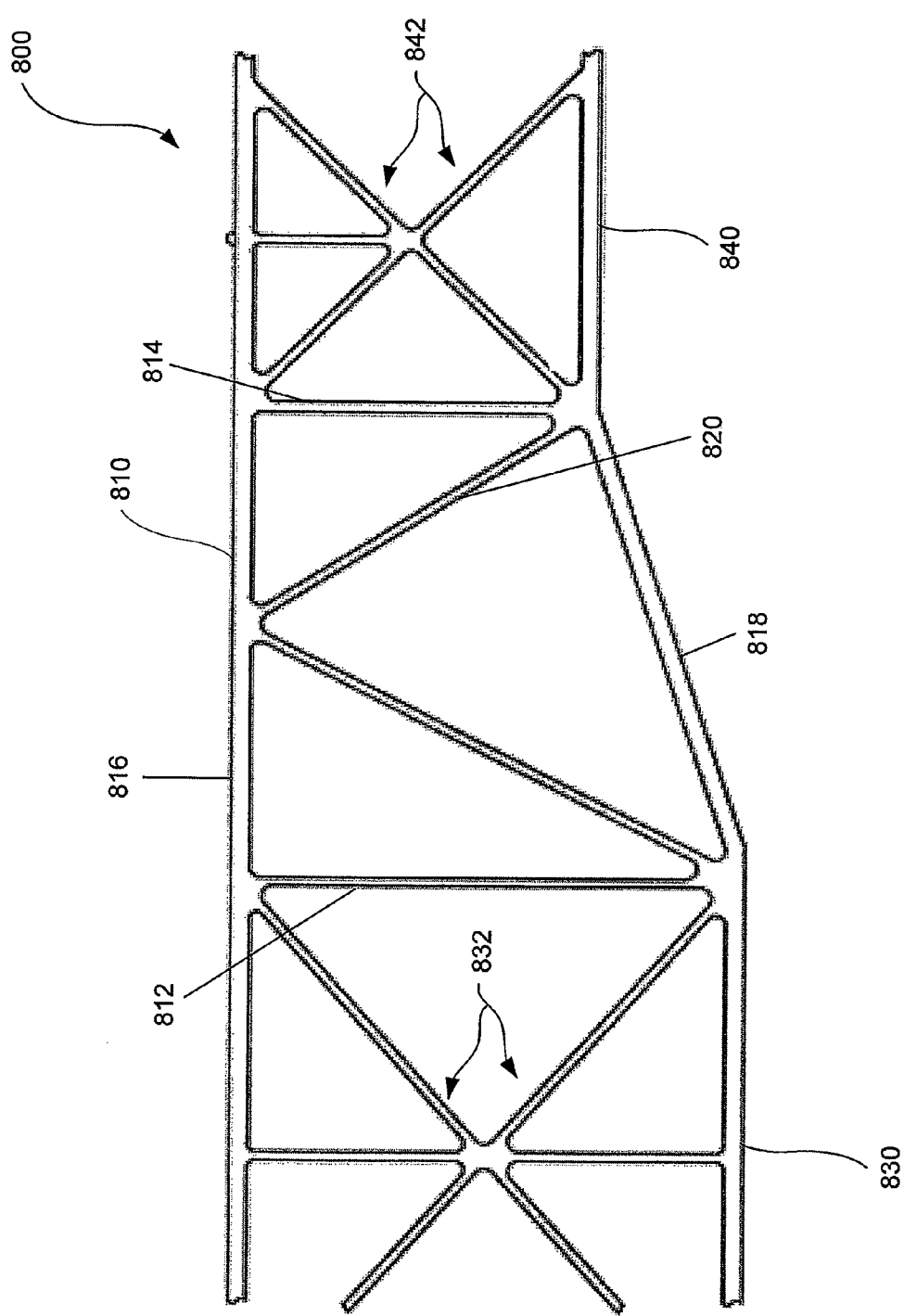
FIG. 8a illustrates one embodiment of a transitional support member of a floor.
Figure 8B:
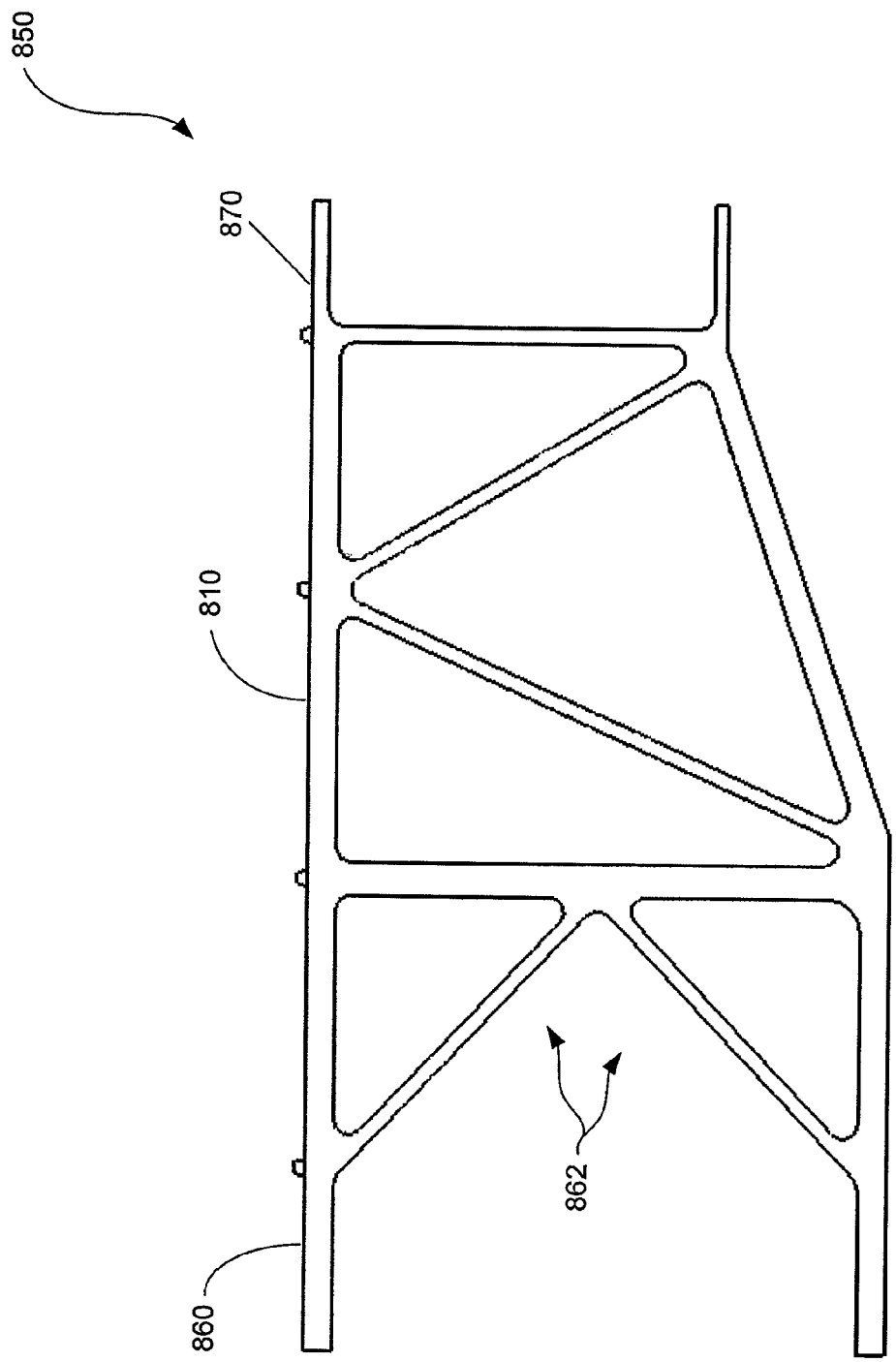
FIG. 8b illustrates another embodiment of a transitional support member of a floor.

In the illustrated embodiment of FIG. 8a, the first and second side portions 830, 840 include internal members 832, 842. In other embodiments, the first and/or second side portions 830, 840 may be free of internal members. For example, and with reference now to FIG. 8b, a transitional support member 850 includes a first side portion 860, a middle portion 810 and a second side portion 870. The first side portion 860 includes some internal members 862 having a sideways V-shaped configuration. The second side portion 870 is free of internal members. Other configurations may be utilized. For example, in some instances, both side members of a transitional support member may be free of internal members.

Figure 9:
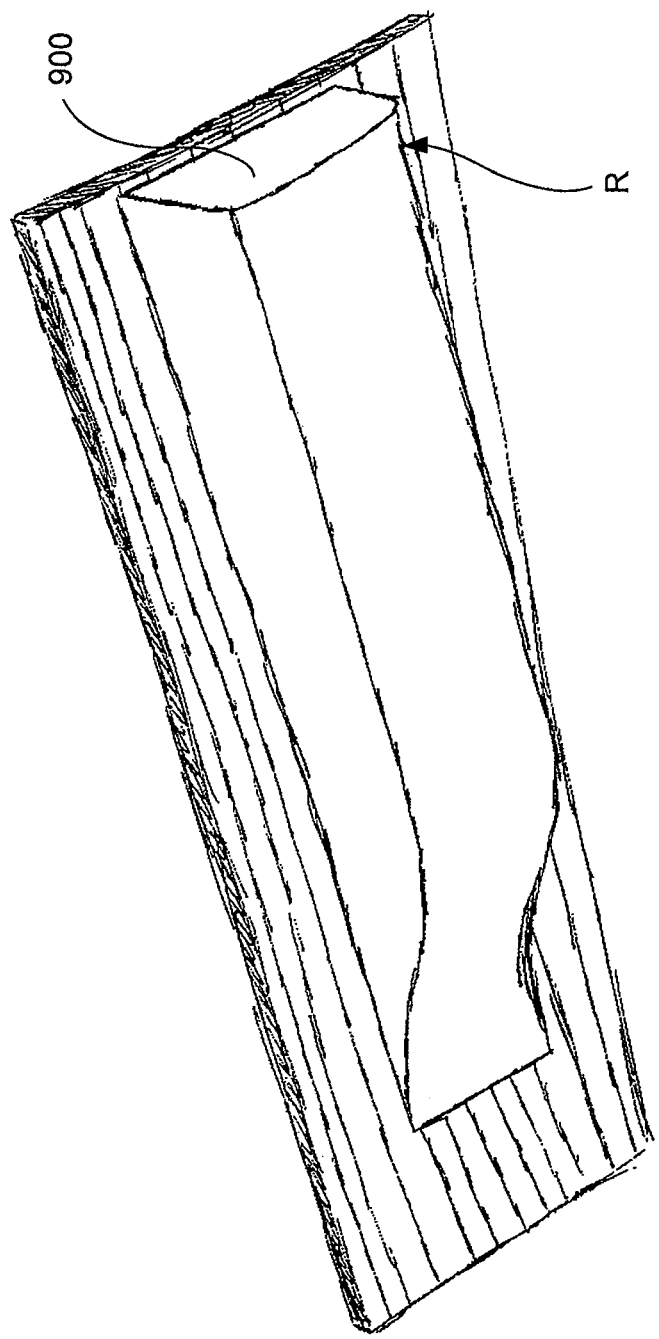
FIG. 9 illustrates one embodiment of an end cap of a trailer.

The trailer may also include an end cap. For example, and with reference to FIG. 9, an end cap 900 may be located near the rear R of a trailer. The end cap 900 is an optional component and is not considered a part of the substantially closed torsion-resistant chamber. The end cap 900 may be open, closed, partially closed, or may include a storage fixture. Thus, in some embodiments, a trailer at least includes (i) a substantially closed torsion-resistant chamber; (ii) an end cap proximal to/connected to a substantially closed torsion-resistant chamber; and (iii) a floor.

Figure 10:
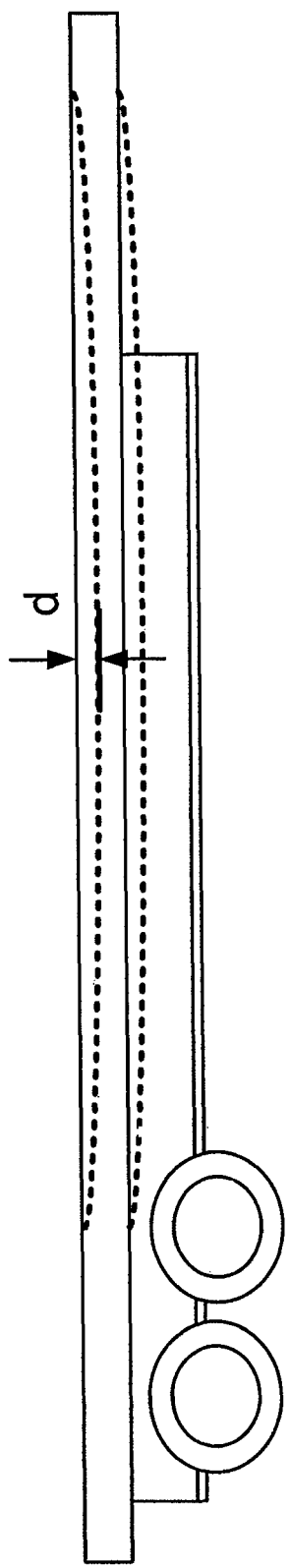
FIG. 10 illustrates one embodiment of bending deformation of a trailer.

As noted, the instantly disclosed trailers may realize equal or better bending deformation than a conventional trailer of similar mass. Bending deformation is the amount an object bends (non-torsionally) when a force is applied to the object. One method for measuring bending deformation is to measure the amount an object is displaced from its normal (non-loaded position) when a load is applied to the object. For example, and with reference now to FIG. 10, the bending deformation of a trailer may be measured by measuring a height of the floor before and after a load is applied to the trailer. In the illustrated embodiment, the vertical distance "d" is the difference between the height of the floor before and after the load is applied to the trailer. Different trailers may bend at different locations, and thus the vertical distance "d" may be the difference between (i) the highest point of the floor when the trailer is in an unloaded condition and (ii) the lowest point of the floor when the trailer is in a loaded condition.

In some embodiments, the trailer may have a reduced mass and realize increased torsion resistance and/or equal or better bending resistance than a conventional trailer of similar load capacity. For example, the instantly disclosed trailers may have a frame weight (i.e., not including tires, axles, suspension, accessories, and the like) in the range of about 4500 to about 5500 pounds (e.g., about 5000 pounds). A conventional trailer of similar load capacity may have a frame weight of at least about 6500 pounds. The new trailer may have a regular weight (including frame, tires, axle, suspension accessories, and the like) of about 7800 to about 8800 pounds, and the conventional trailer may have a regular weight of at least about 9800 pounds. Thus, the instantly disclosed trailers may have a substantially reduced weight (frame or regular), such as about 10% less, or 15% less, or 20% less, or 25% less weight than a conventional trailer of similar load capacity, but realize at least one of (i) equal or better torsion resistance than the conventional trailer and (ii) equal or better bending resistance than the conventional trailer.

Figure 11:
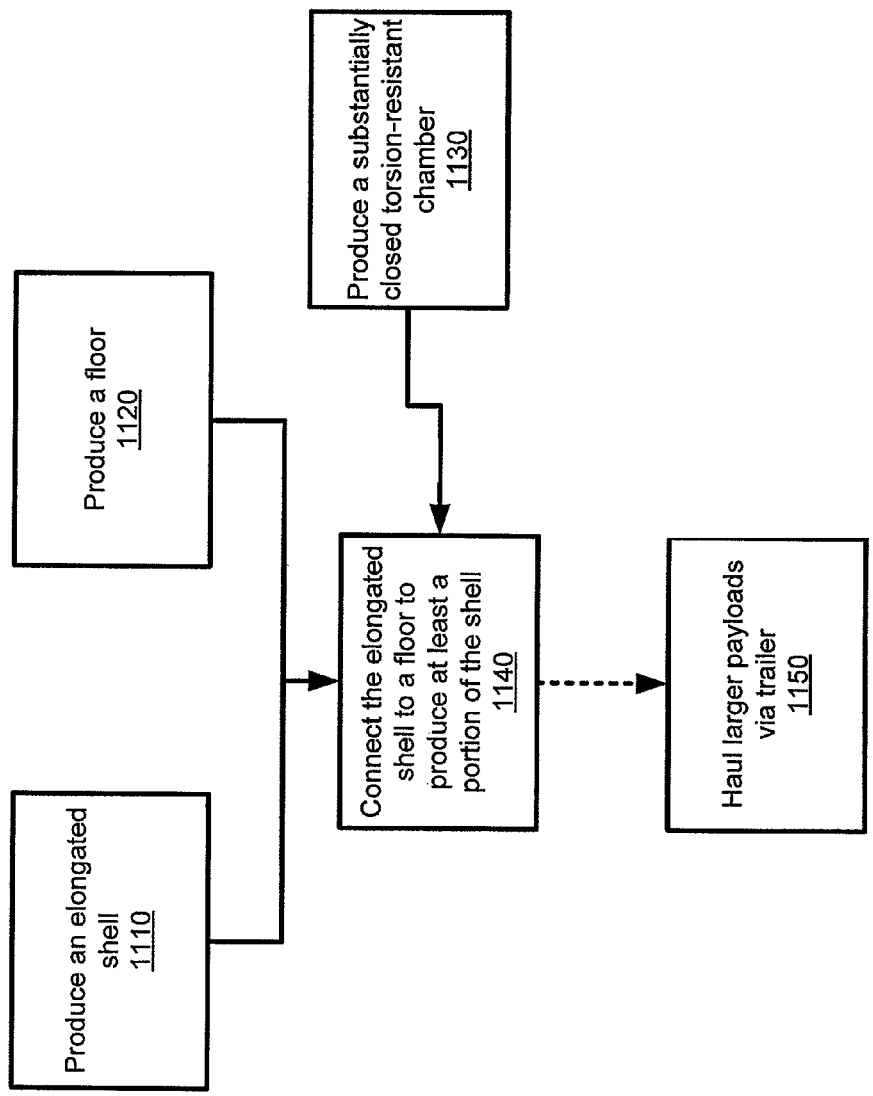
FIG. 11 illustrates one embodiment of a method for producing a trailer.

Methods of producing trailers having a substantially closed torsion-resistant chamber are also provided. In one embodiment, and with reference now to FIG. 11, a method may include the steps of producing an elongated shell 1110, producing a floor 1120, and producing a substantially closed torsion-resistant chamber 1130.

The step of producing the substantially closed torsion-resistant chamber 1130 is at least partially dependent on step 1110, and may be fully dependent on step 1110 or partially dependent on both steps 1110 and 1120. For example, when the elongated shell makes up the lateral sides and bottom of the substantially closed torsion-resistant chamber and the floor makes up the top of the substantially closed torsion-resistant chamber, step 1130 is partially dependent on both steps 1110 and 1120. In this embodiment, when the elongated shell is connected to the floor, the floor in combination with the elongated shell defines at least a majority of the substantially closed torsion-resistant chamber. In another instance, when the elongated shell makes up the lateral sides and bottom of the substantially closed torsion-resistant chamber as well as the top of the substantially closed torsion-resistant chamber (and the floor makes up none or very little of the substantially closed torsion-resistant chamber), step 1130 is completely dependent, or nearly completely dependent, upon step 1110.

As described above, the producing the elongated shell step 1110 may be completed by connecting sheets, extrusions or other components together to form a shell-like structure. As described above, the producing the floor step 1120 may be completed by connecting a plurality of support members together. As described above, the support members may connected in various manners and orientations to produce a lightweight, rugged and/or durable floor.

As connected, the elongated shell and the floor may produce a trailer having a substantially closed torsion-resistant chamber 1140. Since the trailer is more torsion resistant than conventional trailers of similar size and load capacity, the trailer may be more lightweight and/or able to haul larger payloads 1150.

The trailer may be a load-bearing structure capable of transporting a payload via connection to a self-propelled vehicle. In an embodiment, the trailer is a semi-trailer. In an embodiment, the trailer is a flatbed trailer. The trailer may have a longitudinal axis. The longitudinal axis is generally along the long axis of an object, in this case along the long axis of the trailer. A self-propelled vehicle is a vehicle having a means of propulsion.

Example

To simulate the torsion resistance of the newly disclosed trailers relative to a conventional trailer, finite element analysis software is employed. The conventional trailer has a standard double I-beam configuration connected to the bottom of its floor (e.g., flatbed trailers produced by FONTAINE TRAILER COMPANY). The new trailer utilizes a substantially closed torsion-resistant chamber connected to the bottom of its floor. The conventional trailer and the new trailer are of similar size and load capacity. The back tires of each trailer are simulated to be immovable (e.g., held in) concrete. A simulated downward force of 10,000 $lb_f$ is placed on the right front corner of both trailers while a simulated upward force of 10,000 $lb_f$ is placed on the left front corner of both trailers. The conventional trailer simulates an angular deformation of about 18°. The new trailer simulates an angular deformation of about 2°, or about 800% better than the angular deformation of the conventional trailer. The bending deformation of the new trailer is at least about equivalent to the conventional trailer.

While various embodiments of the present disclosure have been described in detail, it is apparent that modifications and adaptations of those embodiments will occur to those skilled in the art. However, it is to be expressly understood that such modifications and adaptations are within the spirit and scope of the present disclosure.

What is claimed is:

1. A trailer comprising:
    a floor having a top surface, a bottom surface, and extending continuously from a front end to a rear end, wherein the top surface is adapted to transport a payload;
    a rear wheel assembly; and
    an elongated shell comprising a bottom wall and side walls, wherein the side walls are secured to the bottom surface of the floor and the elongated shell extends behind the rear wheel assembly; and
    wherein the floor and the elongated shell define together a single, substantially hollow, internally undivided, and substantially closed torsion-resistant chamber with the bottom surface of the floor defining a top wall of the substantially hollow and closed torsion-resistant chamber, and wherein the substantially closed torsion-resistant chamber is free of lattice framework extending therein and the elongated shell is free of apertures that substantially degrade the resistance of the substantially closed torsion-resistant chamber.

2. The trailer of claim 1, wherein the bottom surface of the floor delimitates upwardly the substantially closed torsion-resistant chamber.

3. The trailer of claim 1, wherein the trailer comprises a front, a middle and a rear and the elongated shell comprises a neck portion, and wherein the neck portion is located proximal to the front of the trailer.

4. The trailer of claim 3, wherein the elongated shell further comprises a plurality of supporting ribs, each one of the supporting ribs being superposed to the elongated shell inside the substantially hollow and closed torsion-resistant chamber in the neck portion.

5. The trailer of claim 4, wherein the elongated shell comprises a main body portion adjacent to the neck portion and the substantially hollow torsion-resistant chamber extends continuously from the neck portion to the main body portion.

6. The trailer of claim 1, wherein the elongated shell consists of the bottom wall and the side walls and the side walls of the elongated shell are welded continuously to the bottom surface of the floor and wherein the side walls comprise two lateral side walls spaced-apart from one another and extending continuously from a front end of the elongated shell to a rear end of the elongated shell and the two lateral side walls are aperture free.

7. The trailer of claim 1, wherein the floor comprises a plurality of elongated and juxtaposed support members.

8. The trailer of claim 7, wherein the trailer comprises a front, a middle and a rear and a first one of the plurality of elongated and juxtaposed support members is generally parallel to a longitudinal axis of the trailer, and wherein a second one of the plurality of elongated support members is transverse to the longitudinal axis of the trailer.

9. The trailer of claim 8, wherein the first one of the plurality of elongated support members is located proximal to the front of the trailer.

10. The trailer of claim 9, wherein the second one of the plurality of elongated support members is located proximal to the middle or rear of the trailer.

11. The trailer of claim 10, wherein at least one of the elongated support members comprises shaped internal members arranged between a top member and a bottom member, wherein the shaped internal members comprise at least one of an X-shaped, W-shaped, V-shaped and I-shaped internal members.

12. The trailer of claim 11, wherein the at least one of the elongated support members further comprises at least one thin member stretching between the shaped internal member and the top member.

13. The trailer of claim 11, wherein the at least one of the elongated support members further comprises at least one thin member stretching between the shaped internal member and the bottom member.

14. The trailer of claim 13, wherein the first support member has a larger height than the second support member, and wherein a transitional support member connects that first support member and the second support member.

15. The trailer of claim 1, wherein the elongated shell comprises at least one of a plurality of aluminum interconnected plates and a plurality of interconnected aluminum extrusions.

16. The trailer of claim 1, wherein the trailer is a flatbed trailer.

17. The trailer of claim 1, wherein the trailer realizes an angular deformation that is at least 25% better than the angular deformation of a conventional trailer of similar size and load capacity.

18. The trailer of claim 17, wherein the trailer weighs at least 10% less than the conventional trailer, and wherein the trailer has a bending resistance that is at least equivalent to the bending resistance of the conventional trailer.

19. The trailer of claim 1, wherein the floor is aperture free.

20. The trailer of claim 1, wherein the side walls comprise an end cap at a rear end of the elongated shell.

21. The trailer of claim 1, wherein the elongated shell extends to the rear end of the floor.

* * * * *